(No Model.)
J. MOORE.
DRIVE CHAIN.
No. 559,807. Patented May 12, 1896.
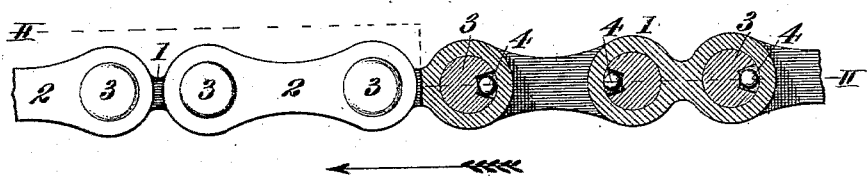
Fig. I.
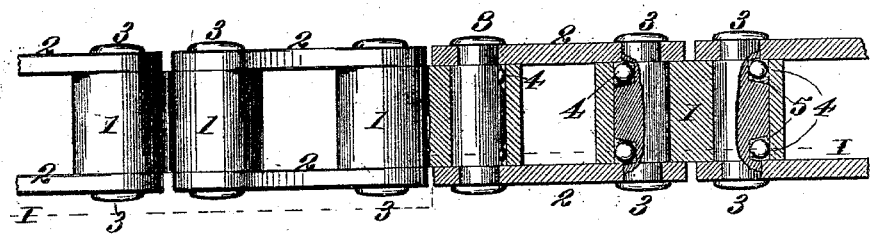
Fig. II.
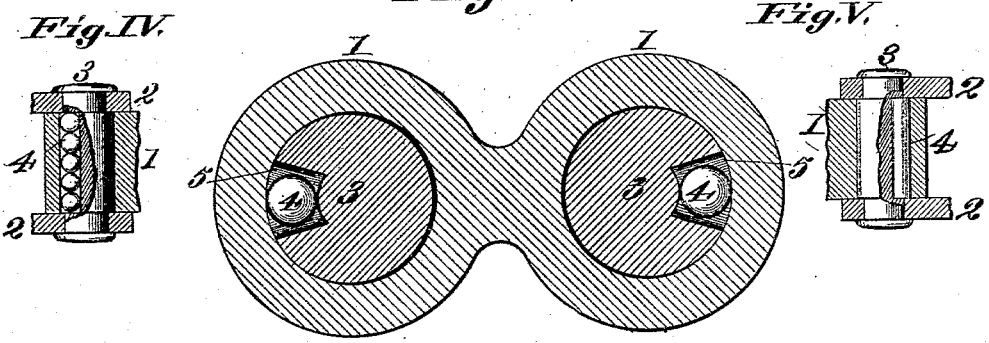
Fig. IV.     Fig. III.     Fig. V.
Attest:
Charles Pickles
Stanley Stoner
Inventor:
John Moore
By Knight Bro
attys
ANDREW B. GRAHAM, PHOTO-LITHO, WASHINGTON, D.C.

UNITED STATES PATENT OFFICE.

JOHN MOORE, OF ST. LOUIS, MISSOURI.

DRIVE-CHAIN.

SPECIFICATION forming part of Letters Patent No. 559,807, dated May 12, 1896.

Application filed February 13, 1895. Renewed October 7, 1895. Serial No. 564,950. (No model.)

*To all whom it may concern:*

Be it known that I, JOHN MOORE, a citizen of the United States, residing at the city of St. Louis, State of Missouri, have invented a certain new and useful Improvement in Drive-Chains, of which the following is a full, clear, and exact specification.

My invention relates to chains which are usually run in endless form over sprocket-wheels having projections adapted to receive the links of the chain. Said sprocket-wheels are mounted, respectively, on a driving and driven shaft, and the joints between the links, as they mount the sprocket, are subjected to unusual pressure and wear. This wear causes the chain, as ordinarily constructed, to elongate and destroy the equality of distance between the links on the chain and the peripheral distance of the pins of the wheels. It is the object of my invention to provide a chain which reduces the friction and wear to a minimum and which it is not necessary to lubricate. I accomplish this object by means of the chain illustrated in the accompanying drawings, in which—

Figure I illustrates a side view of my improved chain, part in section, through the line I I of Fig. II. Fig. II illustrates a top view of the chain, also part in section, through the line II II of Fig. I. Fig. III illustrates an enlarged sectional view of one of the central links, showing the ball-bearing of my invention. Fig. IV illustrates a modified form of my invention, showing balls placed the whole width of the central link. Fig. V illustrates another modified form of my invention, showing a roller-bearing in the form of a cylindrical-pin bearing instead of a ball-bearing.

The same numbers refer to the same parts throughout the several figures.

1 1 are the central links.

2 2 are the side links of the drive-chain, arranged in the usual manner to provide an opening between the said central links adapted to receive the sprockets of the wheel. The central links are provided with two cylinder-holes, one at each end of the link, through which holes pass the pins or rivets 3. These pins or rivets 3 pass through both the central and side links and engage the same, making the necessary oscillating joint.

4 4 are balls contained within segmental chambers 5, said chambers being cut in the pins or rivets 3. The balls are of slightly greater diameter than the depth of the chambers, of less diameter than the width of the latter, and are adapted to bear on the walls of the central link at either end of the cylindrical holes therethrough. The rivets or pins are fastened to the side links 2 in such a manner as to bring the chambers 5 coincident with the walls of the links 1, against which the bearing is to come. It is obvious that this construction will admit of any desired angular motion of the joint, the amount of the motion being only limited by the links themselves. The motion of two adjoining links relative to each other is oscillatory with, perhaps, a slight sidewise movement. Now as the joint is worked the pressure is entirely reduced to a friction between the balls and the walls of the central link and rivet chamber, and as the bearing-surfaces are perfectly true and smooth the working of the joints between the links is accomplished with a very small degree of friction and without the need of lubrication.

While I have described the bearing as carrying but two balls, it is obvious that any desired number may be used, as shown in Fig. IV; or instead of a plurality of balls a cylindrical pin may be used, as shown in Fig. V, without materially altering the character of my invention.

What I claim as my invention, and desire to secure by Letters Patent, is—

1. The combination of the central links, having two cylindrical holes, the side links, the connecting-pins having segmental chambers located on one side thereof, and the rollers of slightly greater diameter than the depth of the chambers, and of less diameter than the width of the latter; substantially as described.

2. The combination of the central links having two cylindrical holes, the side links, the connecting-pins having segmental chambers located at both ends of each pin on one side thereof, and the balls of slightly greater diameter than the depth of the chambers and of less diameter than the width of the latter; substantially as described.

JOHN MOORE.

In presence of—
GEO. H. KNIGHT,
STANLEY STONER.